United States Patent [19]

Hähnle

[11] 4,257,943
[45] Mar. 24, 1981

[54] DISPERSE AZO DYESTUFFS AND PROCESS FOR PREPARATION AND THEIR USE

[75] Inventor: Reinhard Hähnle, Königstein, Fed. Rep. of Germany

[73] Assignee: Hoechst Aktiengesellschaft, Frankfurt am Main, Fed. Rep. of Germany

[21] Appl. No.: 933,521

[22] Filed: Aug. 14, 1978

[30] Foreign Application Priority Data

Aug. 16, 1977 [DE] Fed. Rep. of Germany ....... 2736785

[51] Int. Cl.³ .................. C09B 29/26; D06P 1/18; D06P 3/54
[52] U.S. Cl. .................. 260/207; 568/584; 568/587; 564/223; 564/441
[58] Field of Search ........................ 260/207

[56] References Cited

U.S. PATENT DOCUMENTS

| | | | |
|---|---|---|---|
| 2,083,308 | 6/1937 | Senn | 260/207 |
| 3,250,762 | 5/1966 | Gies et al. | 260/207 |
| 3,342,804 | 9/1967 | Mueller | 260/207.1 |

FOREIGN PATENT DOCUMENTS

| | | | |
|---|---|---|---|
| 2004131 | 8/1971 | Fed. Rep. of Germany | 260/207 |
| 1361053 | 4/1964 | France | 260/207 |
| 1572585 | 6/1969 | France | 260/207 |
| 523294 | 1/1940 | United Kingdom | 260/207 |
| 1037164 | 7/1966 | United Kingdom | 260/207 |

*Primary Examiner*—Floyd D. Higel
*Attorney, Agent, or Firm*—Curtis, Morris & Safford

[57] ABSTRACT

A compound of the formula

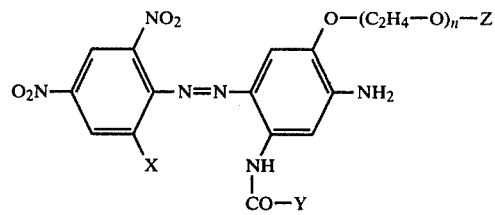

in which X represents chlorine or bromine, Y and Z each represent methyl or ethyl, and n stands for the integer 1 or 2, said compound being useful as a navy blue dye for the dyeing or printing synthetic fibrous materials, preferably polyester fibers, in aqueous baths, suitably in the form of dyestuff preparations containing dispersing agents, and also useful for dyeing fibrous materials in organic solvents, such as trichloroethylene or methanol.

5 Claims, No Drawings

DISPERSE AZO DYESTUFFS AND PROCESS FOR PREPARATION AND THEIR USE

The present invention relates to novel disperse azo dyestuffs, a process for their preparation and their use for dyeing or printing synthetic fiber materials.

The present invention provides novel navy blue disperse dyes of the general formula (1)

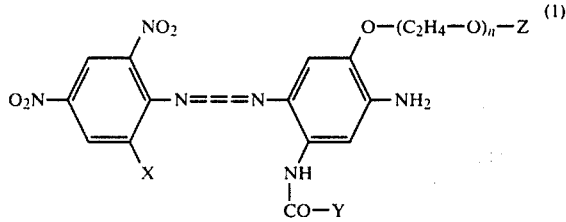

in which X represents a chlorine or bromine atom, Y and Z which are independent of each other are methyl or ethyl, and n is the integer 1 or 2, as well as a process for their preparation and their use for dyeing and printing synthetic fiber materials.

The novel dyestuffs are prepared by coupling diazotized amines of the general formula (2)

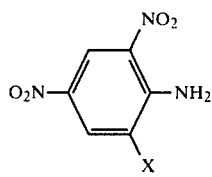

with coupling components of the general formula (3)

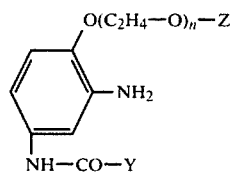

X, Y, Z and n being defined as above, in an aqueous solution in a manner known per se.

The coupling components required for the preparation of the novel dyestuffs may be obtained according to the following reaction scheme (Y, Z and n being defined as above):

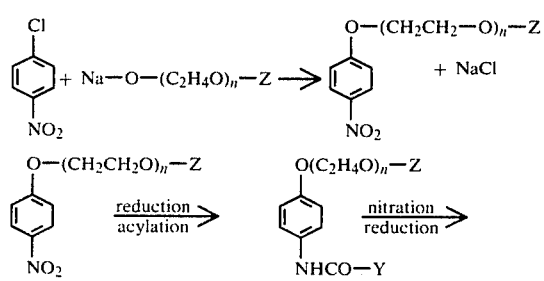

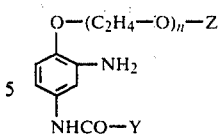

It is also possible to obtain the coupling components from 2,4-dinitro-chlorobenzene by reaction with the desired alcoholate, reduction and partial acylation.

For printing and dyeing synthetic fiber materials, preferably polyester fibers, in an aqueous bath, the dyestuffs are suitably used in the form of dyeing preparations containing dispersing agents. In this process the novel dyestuffs may be present in the dyeing preparations alone or in a mixture with other dispersion dyes. The novel dyestuffs are also appropriate for dyeing in solvents such as, trichloroethylene or methanol.

In French patent specification No. 1 572 585, dyestuffs having a similar structure and known for dyeing or printing polyester fibers are described.

The dyestuff disclosed example 13 of the French patent has the following structure which is comparable to the structure of the claimed compounds:

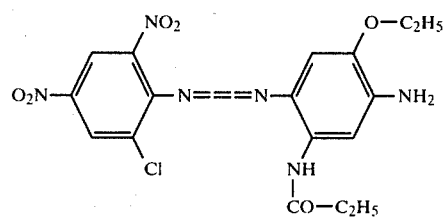

Compared with these compounds, the dyestuffs of the invention are marked by improved absorption capacity and better build-up in dyeing polyester fibers in the high-temperature dyeing process, as well as by higher dyestuff yield in dyeing polyester fibers according to the carrier process. Furthermore, the novel dyestuffs exhibit favorable fastness properties to light, gas fading and sublimation and are only minimally sensitive to reductive action.

Both the dyestuffs of the invention and the dyestuff disclosed in the said French Patent Specification have the advantage that no alkylating agents are used in the preparation of the coupling components contained therein. All alkylating agents are strongly toxic, require special safety measures are required in handling. However, the general properties of the blue disperse dyestuffs of French patent specification No. 1 572 585 are unsatisfactory, so there was a need to find disperse dyes whose preparation was simple and uncomplicated, and whose general properties were better.

The following Examples serve to illustrate the present invention.

EXAMPLE 1

1000 Parts by weight of 100% sulfuric acid are placed into a stirring flask. 217.5 Parts by weight of 100% 2,4-dinitro-6-chloroaniline are then introduced in a way that the temperature of 40° C. is not exceeded. After the entire 2,4-dinitro-6-chloroaniline has been dissolved, 334 parts by weight of 40% nitrosyl-sulfuric acid are introduced, starting at a temperature of from 20° to 25° C., in such a manner that the temperature rises by itself to 35° to 38° C. Subsequently the mixture is continued to be stirred for 2 hours. A test is made to find out whether a sample is clearly soluble in ice water. After the diazotization has been completed, the mixture is cooled to +20° C., and the solution thus obtained of 2,4-dinitro-6-chlorobenzene-diazonium sulfate is added to an agitated mixture of 1500 parts by weight of water, 2000 parts by weight of ice, 224 parts by weight of 2-amino-4-acetamino-1-β-methoxy-ethoxy-benzene and 100 parts by weight of acetic acid within 30 minutes. During the addition process the temperature is maintained at 0° C. by adding about 3000 parts by weight of ice. Stirring is continued for 30 minutes, then the mixture is diluted with 6000 parts by weight of water and stirred for another hour. Finally the dyestuff formed is filtered off and washed with water until it is free from acid.

A suction-filter cake of about 1000 parts by weight is obtained which contains 320 parts by weight (71% of the theory) of dyestuff. By grinding said cake in a bead mill with 320 parts by weight of a dispersing agent on the basis of the sodium salt of lignin-sulfonic acid and adjusting the weight to 1600 parts by weight with water, a 20% dyeing preparation is obtained which is suitable for dyeing and printing polyester fabric. The prints and/or dyeings on polyester fabric show a deep blue shade and exhibit good to very good fastness properties.

The the novel dyestuffs of the general formula

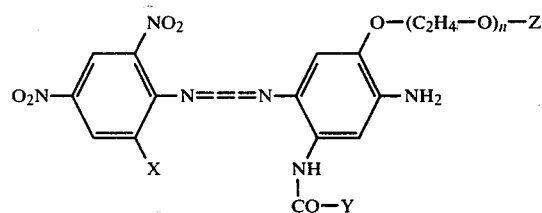

which are specified in the following Table may be obtained in analogous manner yield deep blue dyeings with good to very good fastness properties on polyester fibers.

| Example No. | n | X | Y | Z |
|---|---|---|---|---|
| 2 | 1 | Cl | —CH$_3$ | —C$_2$H$_5$ |
| 3 | 1 | Cl | —C$_2$H$_5$ | —CH$_3$ |
| 4 | 1 | Cl | —C$_2$H$_5$ | —C$_2$H$_5$ |
| 5 | 1 | Br | —CH$_3$ | —CH$_3$ |
| 6 | 1 | Br | —CH$_3$ | —C$_2$H$_5$ |
| 7 | 1 | Br | —C$_2$H$_5$ | —CH$_3$ |
| 8 | 1 | Br | —C$_2$H$_5$ | —C$_2$H$_5$ |
| 9 | 2 | Cl | —CH$_3$ | —CH$_3$ |
| 10 | 2 | Cl | —CH$_3$ | —C$_2$H$_5$ |
| 11 | 2 | Cl | —C$_2$H$_5$ | —CH$_3$ |
| 12 | 2 | Cl | —C$_2$H$_5$ | —C$_2$H$_5$ |
| 13 | 2 | Br | —CH$_3$ | —CH$_3$ |
| 14 | 2 | Br | —CH$_3$ | —C$_2$H$_5$ |
| 15 | 2 | Br | —C$_2$H$_5$ | —CH$_3$ |
| 16 | 2 | Br | —C$_2$H$_5$ | —C$_2$H$_5$ |

I claim:
1. A compound of the formula

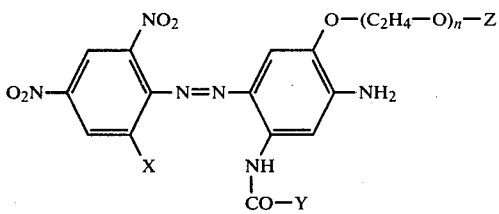

in which X represents chlorine or bromine, Y and Z each represent methyl or ethyl, and n stands for the integer 1 or 2.

2. The compound, as claimed in claim 1, wherein n stands for the integer 2.

3. The compound, as claimed in claim 1, wherein Z represents methyl.

4. The compound, as claimed in claim 1, wherein X represents chlorine, Z and Y each represent methyl, and n stands for the integer 1.

5. The compound, as claimed in claim 1, wherein X represents chlorine, Z represents methyl, Y represents ethyl and n stands for the integer 1.

* * * * *